(12) United States Patent
Martin et al.

(10) Patent No.: US 8,230,025 B2
(45) Date of Patent: Jul. 24, 2012

(54) SYSTEM AND METHOD FOR DELIVERING VARIABLE SIZE MESSAGES BASED ON SPAM PROBABILITY

(75) Inventors: Daryl Martin, Paradise (CA); John F. Wilson, Waterloo (CA); Christopher O'Keefe, St. Johns (CA)

(73) Assignee: Research In Motion Limited, Waterloo (CA)

( * ) Notice: Subject to any disclaimer, the term of this patent is extended or adjusted under 35 U.S.C. 154(b) by 1093 days.

(21) Appl. No.: 11/858,461

(22) Filed: Sep. 20, 2007

(65) Prior Publication Data

US 2009/0083758 A1 Mar. 26, 2009

(51) Int. Cl.
G06F 15/163 (2006.01)
(52) U.S. Cl. ......................................... 709/206; 719/313
(58) Field of Classification Search .................. 719/313
See application file for complete search history.

(56) References Cited

U.S. PATENT DOCUMENTS

| | | | |
|---|---|---|---|
| 2003/0200267 A1 | 10/2003 | Garrigues | |
| 2005/0076087 A1* | 4/2005 | Budd et al. ..................... | 709/206 |
| 2005/0204006 A1* | 9/2005 | Purcell et al. .................. | 709/206 |
| 2006/0168006 A1* | 7/2006 | Shannon et al. ............. | 709/206 |
| 2006/0277257 A1* | 12/2006 | Kromann et al. ............ | 709/206 |
| 2007/0079379 A1* | 4/2007 | Sprosts et al. .................. | 726/24 |
| 2007/0124390 A1 | 5/2007 | Sivakumar et al. | |
| 2007/0192490 A1* | 8/2007 | Minhas ......................... | 709/226 |
| 2007/0204022 A1* | 8/2007 | Hsu et al. ..................... | 709/223 |
| 2007/0220607 A1* | 9/2007 | Sprosts et al. .................. | 726/24 |
| 2009/0013054 A1* | 1/2009 | Libbey et al. ................. | 709/207 |

FOREIGN PATENT DOCUMENTS

WO 2006014314 A 2/2006

OTHER PUBLICATIONS

"Spam", Microsoft Computer Dictionary, 5th Ed, 2002, p. 492.*
Zdziarski, J., Ending Spam: Bayesian Content Filtering and the Art of Statistical Language Classification, (Jul. 2005), No Starch Press, Inc., pp. 1-287.*
Extended European Search Report dated Mar. 26, 2008 from EP07116808.2.
Examination Report dated Nov. 30, 2010 from CA2639615.

* cited by examiner

*Primary Examiner* — H. S. Sough
*Assistant Examiner* — Brian Wathen
(74) *Attorney, Agent, or Firm* — Jenna L. Wilson; Dimock Stratton LLP

(57) ABSTRACT

There is disclosed a system and method for delivering a message to a communication device. In an embodiment, the method comprises obtaining a probability that the message is spam; in dependence upon the probability that the message is spam, determining a variable message size; and sending the message to the communication device in dependence upon the determined variable message size. In an embodiment, the method further comprises receiving a user response whether the message is spam; and if the message is verified as being spam, then filtering the message from the communication device.

8 Claims, 7 Drawing Sheets

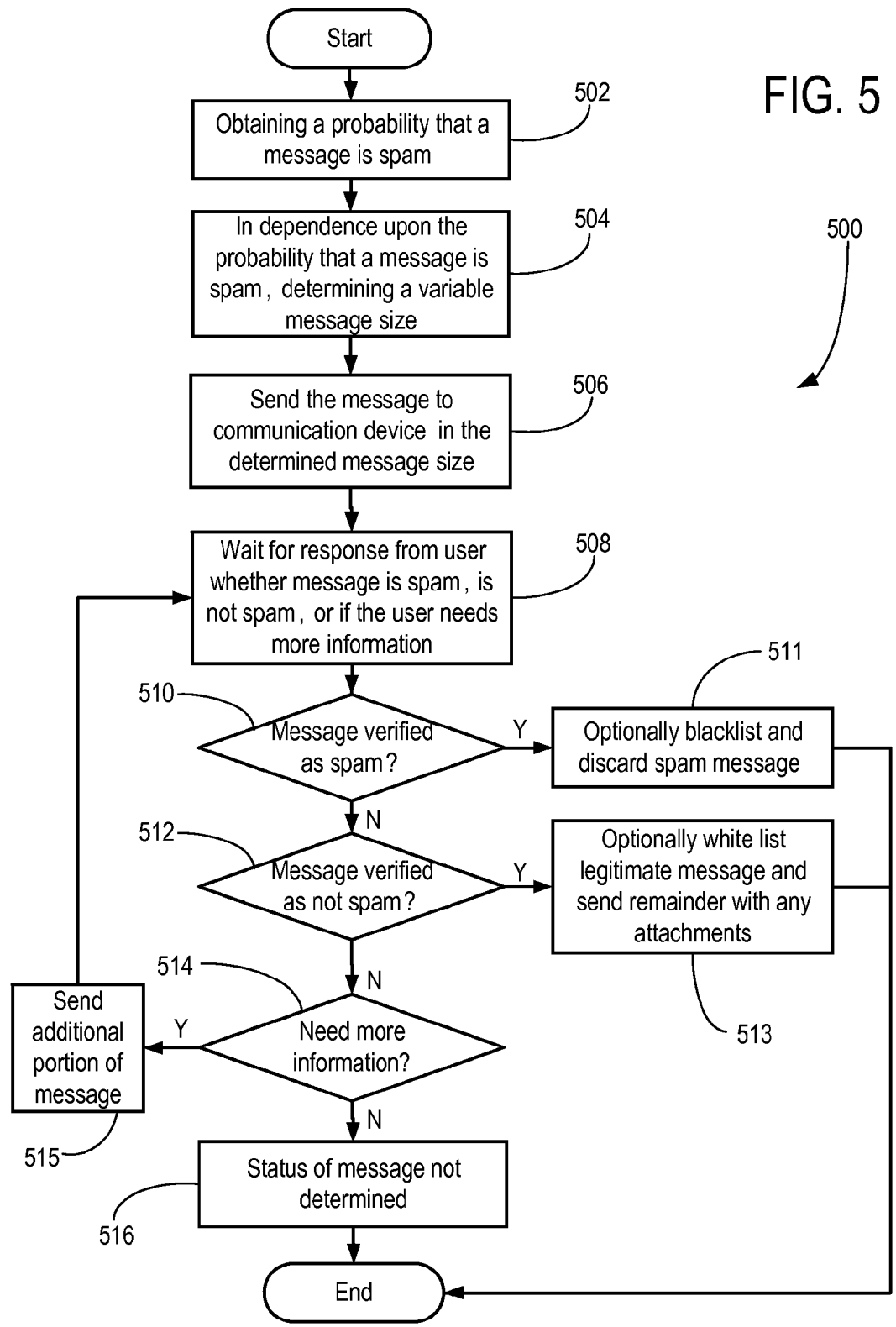

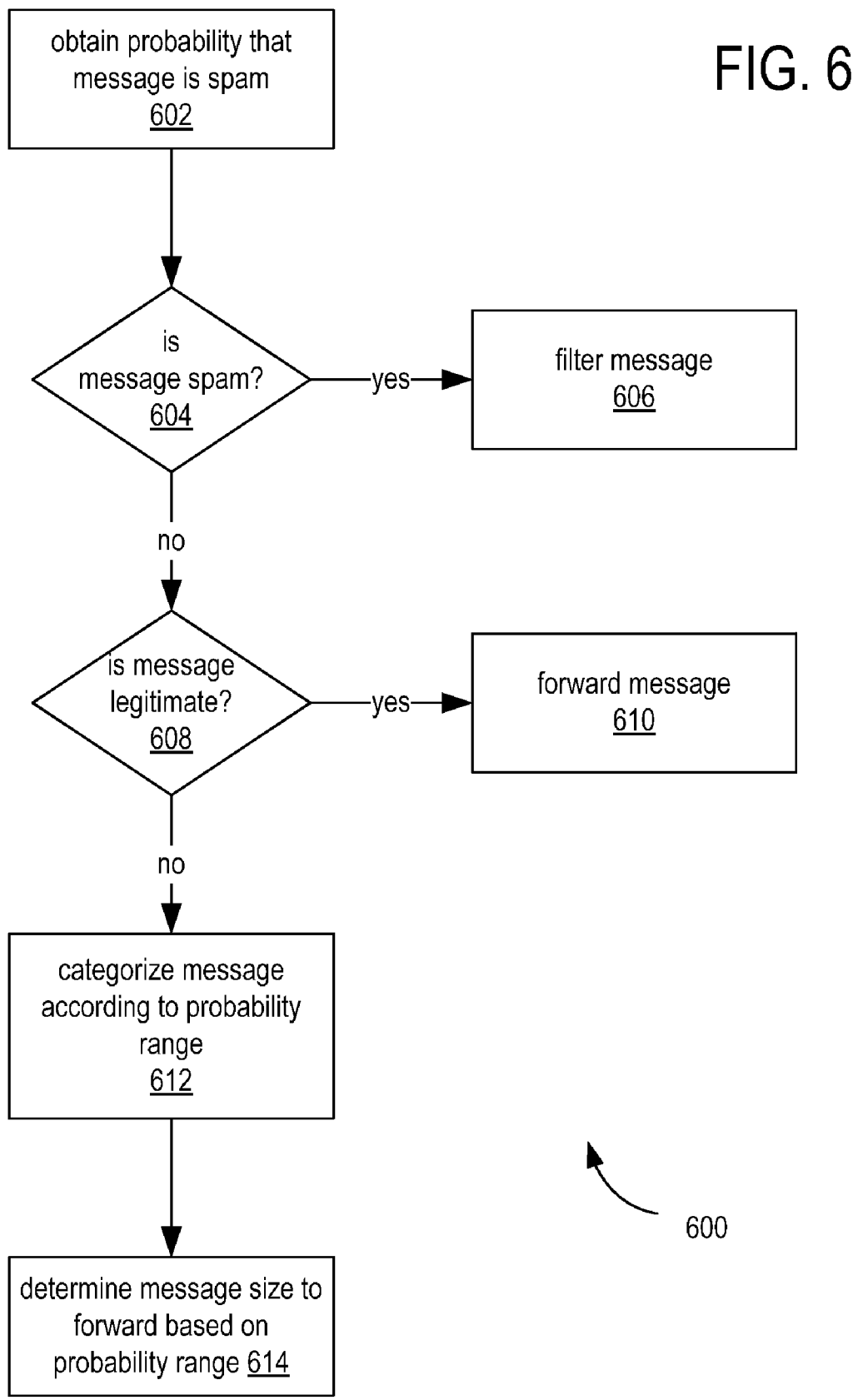

SYSTEM AND METHOD FOR DELIVERING VARIABLE SIZE MESSAGES BASED ON SPAM PROBABILITY

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

The present invention relates generally to systems and methods for delivering messages.

BACKGROUND

Spam continues to be a great inconvenience for many email users, as these unwanted messages may slip by even the most intelligent spam filters which attempt to maintain an appropriate balance between letting too much spam through, and preventing legitimate messages from getting through. For email users using wireless email devices, the problem may be exacerbated by the fact that they may be charged for receiving the unwanted messages once their bandwidth usage exceeds their monthly data plan with their carrier. What is needed is an improved system and method for dealing with suspected spam messages.

BRIEF DESCRIPTION OF THE DRAWINGS

In the figures which illustrate exemplary embodiments:

FIG. 5 is a schematic flowchart of a method in accordance with an embodiment.

FIG. 6 is a schematic flowchart of further detail of select portions of the method of FIG. 5.

DETAILED DESCRIPTION

As noted above, the present invention relates generally to a system and method for delivering variable size messages based on spam probability.

Figure 1:
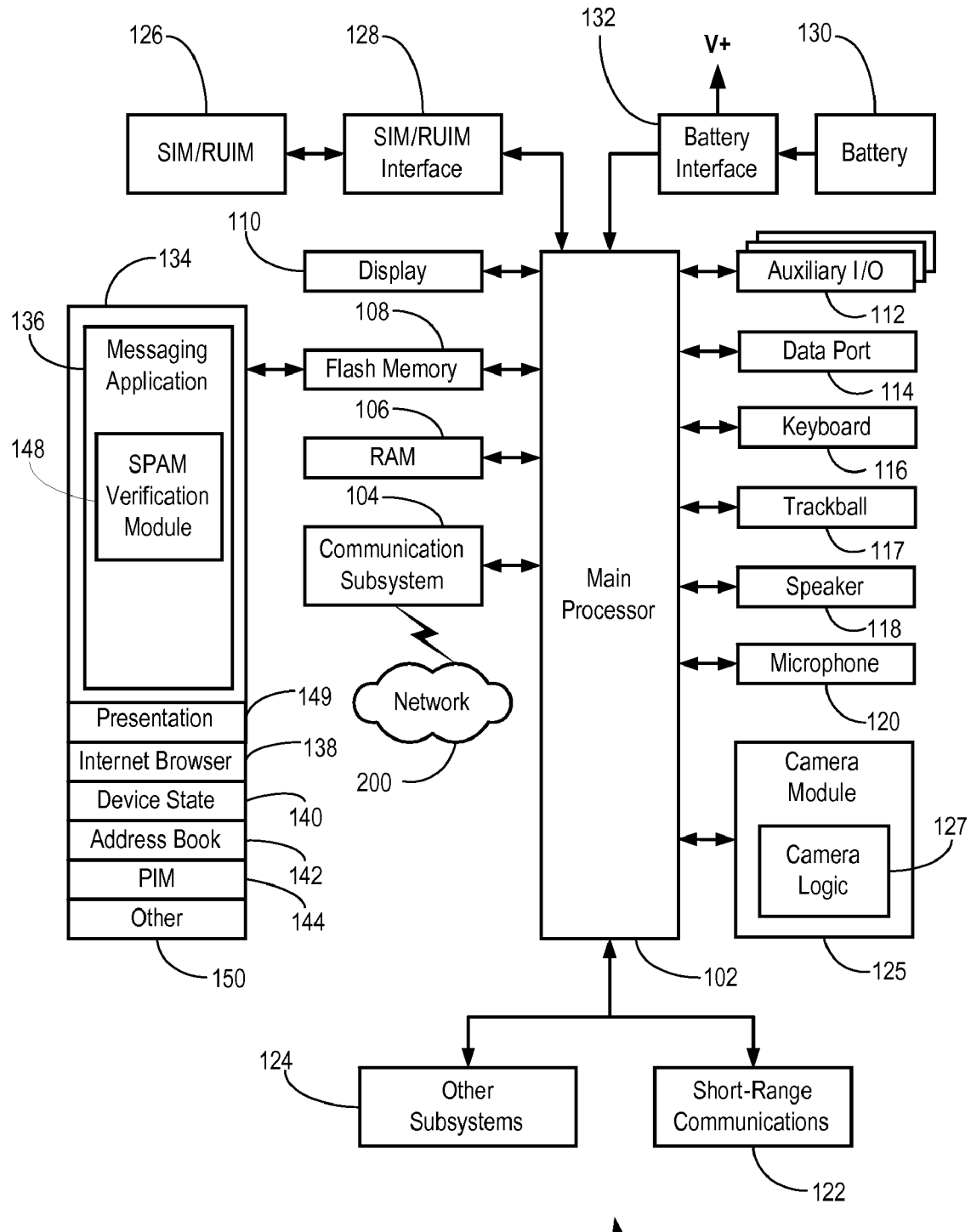
FIG. 1 is a schematic block diagram of various components that may be found in a handheld mobile communication device.

In an illustrative embodiment, the invention may be practiced with a handheld mobile communication device in a wireless operating environment. Shown in FIG. 1 is a schematic block diagram of an illustrative handheld mobile communication device 100. The communication device 100 may comprise a number of components, including a main processor 102 which controls the overall operation of communication device 100. Communication functions, including data and voice communications, may be performed through a communication subsystem 104. The communication subsystem 104 may receive messages from and send messages to a wireless network 200.

The main processor 102 may also interact with additional subsystems such as a random access memory (RAM) 106, a flash memory 108, a display 110, an auxiliary input/output (I/O) subsystem 112, a data port 114, a keyboard 116, a trackball 117, a speaker 118, a microphone 120, short-range communications 122, a GPS subsystem or other subsystems 124, a camera module 125, and associated camera logic 127.

Some of the subsystems of the communication device 100 may perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list. The trackball 117 may be used for various navigation functions, such as navigating through a graphical user interface (GUI) menu displayed on display 110. The trackball 117 may also be configured with a secondary actuation feature, such as allowing a user to depress the trackball, to allow selection of a highlighted item.

Still referring to FIG. 1, operating system software used by the main processor 102 is typically stored in a persistent store such as flash memory 108. Those skilled in the art will appreciate that the operating system, specific device applications, or parts thereof, may be temporarily loaded into a volatile store, such as the RAM 106, for processing by main processor 102.

The communication device 100 may send and receive communication signals over the wireless network 200 after required network registration or activation procedures have been completed. Network access may be associated with a subscriber or user of the communication device 100.

The communication device 100 may be a battery-powered device and may include a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the communication device 100. The battery 130 may be used to power all components and modules in the communication device 100.

The main processor 102, in addition to its operating system functions, enables execution of various software applications 134 on the communication device 100. A subset of software applications 134 that control basic device operations, including data and voice communication applications, will normally be installed on the communication device 100 during its manufacture.

The software applications 134 may include a messaging application 136. The messaging application 136 can be any suitable software program that allows a subscriber or user of the communication device 100 to send and receive wireless text communications. Messages that have been sent or received by the user are typically stored in local storage such as flash memory 108 of the communication device 100, or in some other suitable storage element in the communication device 100. In an alternative embodiment, some of the sent and received messages may be stored remotely from the communication device 100 such as in a data store of an associated host system that the communication device 100 communicates with.

In an embodiment, the messaging application 136 may include a spam verification module 148. This spam verification module 148 will be described in more detail further below.

The communication device 100 may further include an Internet browser 138, a device state module 140, an address book 142, a personal information manager (PIM) 144, and various other modules 150. Additional software applications may also be loaded onto the communication device 100 through at least one of the wireless network 200, the auxiliary I/O subsystem 112, the data port 114, the short-range communications subsystem 122, or other device subsystem 124.

Figure 2:
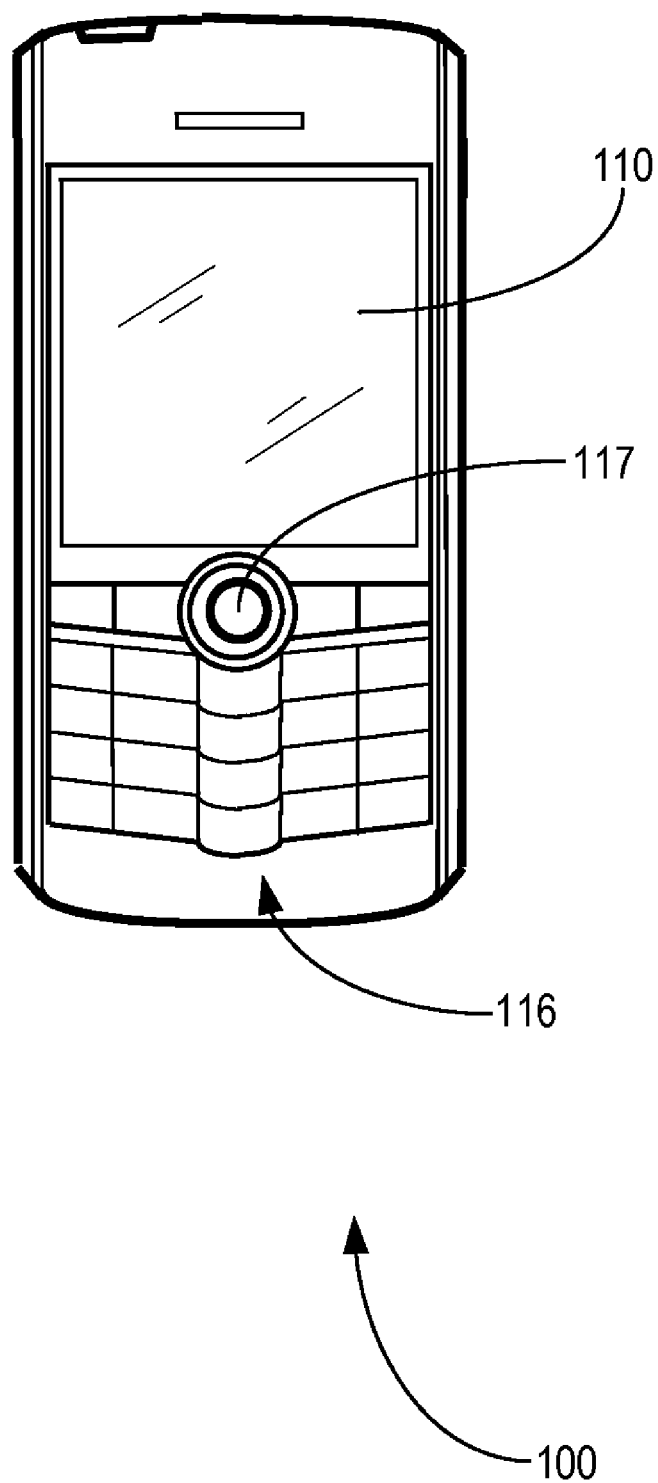
FIG. 2 is an illustrative example of a handheld mobile communication device which may provide an operating environment.

Now referring to FIG. 2, shown is an illustrative front view of a handheld mobile communication device 100 that may provide a suitable operating environment. As shown, the communication device 100 may include a display 110, a keyboard 116, and other input or navigation means such as a trackball 117. The display 110 may be configured to display various screens allowing the user of device 100 to view screen outputs from the various software applications 134, including the presentation module 149. Display 110 may also be configured to provide a touch-sensitive screen input in response to a prompt or query displayed on display 110.

Figure 3:
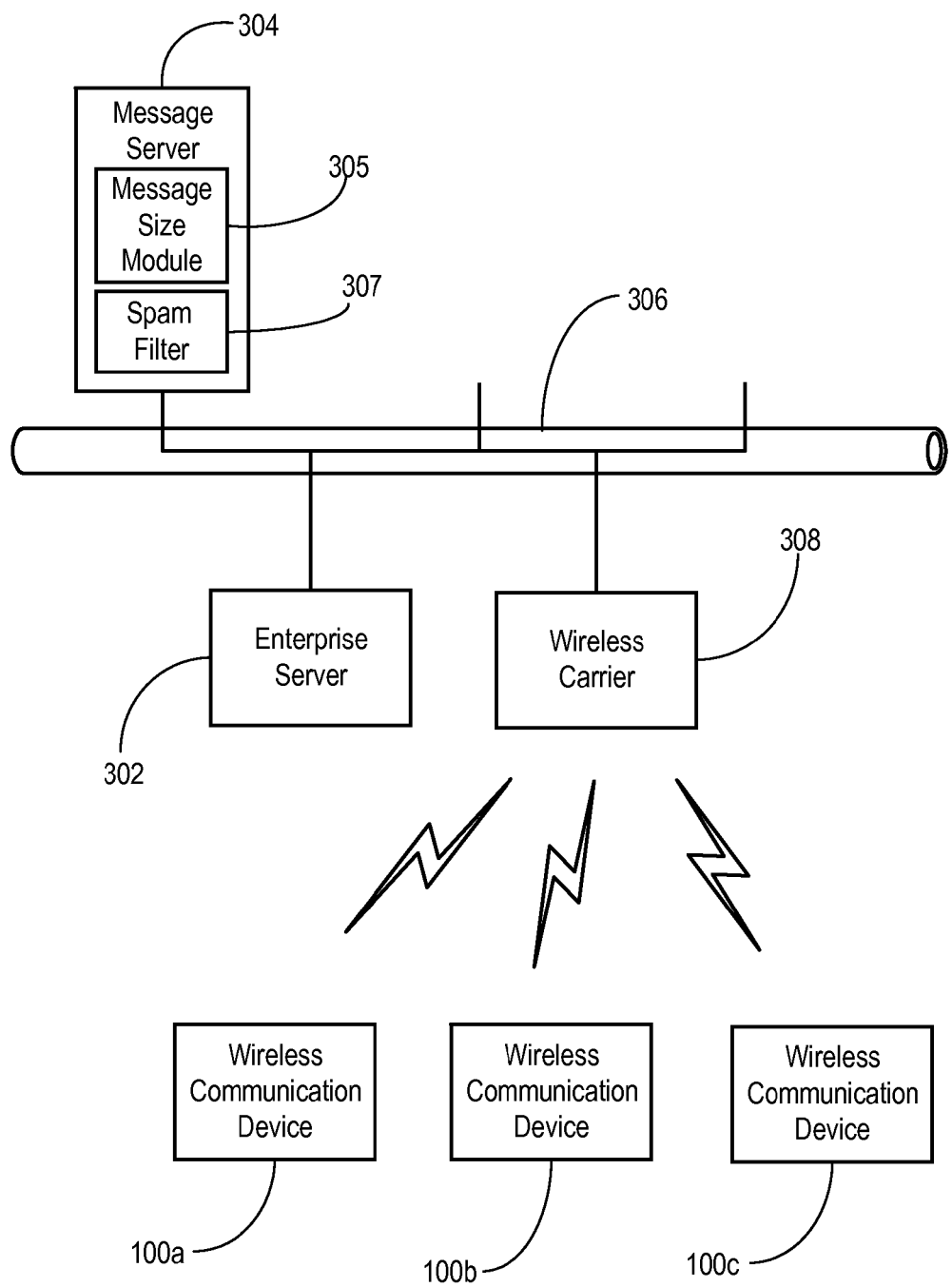
FIG. 3 is a schematic block diagram of an illustrative network which may provide a suitable operating environment.

Now referring to FIG. 3, shown is a schematic block diagram of an illustrative network 300 that may provide a suitable operating environment. As shown, network 300 includes an enterprise server 302 that may be configured to manage various communications applications including an email messaging application for users of wireless communication devices 100a to 100c. Enterprise server 302 may be connected via a local area network (LAN) or wide area network (WAN) 306 to a wireless carrier 308 configured to wirelessly transmit data to and receive data from a plurality of wireless communication devices 100a, 100b, 100c operated by various users. Enterprise server 302 may also be connected to a message server 304 configured to manage all inbound and outbound messages as seen by users on their communication devices 100a-100c.

In an embodiment, as an illustrative example, message server 304 may contain a spam filter 307 and a message size module 305 for delivering variable size messages. It will be appreciated, however, that the spam filter 307 and message size module 305 may alternatively reside on enterprise server 302, or on another external server or email store (not shown) accessible via network 306 or wireless carrier 308. Regardless of the location of the spam filter 307 and message size module 305, the function performed by each will be substantially the same, as will now be described.

In an embodiment, spam filter 307 may employ various types of filtering algorithms in order to attempt to filter out unwanted spam messages. Regardless of how intelligent a spam filtering algorithm is, it must try to maintain a reasonable balance between filtering not enough spam messages, and preventing legitimate messages from getting through. In some contexts, such as a business environment for example, it may be unacceptable if just one legitimate message from a client does not get through. Therefore, the spam filter 307 may be configured to err on the side of caution, and to allow messages that may be suspected of being spam to pass through for verification by the user.

However, with current spam filters, if a certain confidence threshold is crossed, then a message may be forwarded to a user in the same manner to be verified regardless of the confidence level of the suspected spam message. This may result in too many spam messages being forwarded for verification, and in the case of wireless communication devices 100 with set monthly bandwidth limits may result in additional bandwidth costs for forwarding such messages to the device 100 for verification.

To address this problem, the inventors propose to vary the size of the messages forwarded for verification based on a calculated probability of whether or not a message is suspected of being spam. For example, if a message is recognized as being sent from a known spammer on a blacklist (e.g. based on the email address, domain name, or IP address), then the message may be identified as being spam with a 100% probability. Also, if a message is recognized as being sent from a known contact on a white list, then the message may be identified as being legitimate, with a virtually 0% probability of the message being spam.

On the other hand, if a message is sent from an unrecognized email address or domain name, but raises strong suspicions of being spam based on form or content, then the message may be identified as having a high probability (e.g. 81% to 99%) of being spam. Other categories may include, for example, low probability (1% to 20%), low-moderate probability (21% to 40%), moderate probability (41% to 60%), and moderate-high probability (61% to 80%). Messages may thus be categorized into various spam probability categories based on the probability that the message is spam. It will be appreciated that these probability ranges expressed in percentages are illustrative, and that a fewer or a larger number of categories may be specified. As well, rather than an expression of ranges in percentages, it will be appreciated that numeric values may be provided based on a scoring system (e.g. 35 out of a possible score of 60 that a message is spam). Thus, the probability used to categorize messages may be calculated based upon a numeric value assigned by spam filter 307 at the message server 304, and which may be converted as necessary to a percentage value representing the probability of the message being spam.

In an embodiment, based on the probability of the message being spam, the message size module 305 of message server 304 may be adapted to vary the size of the message delivered to devices 100a to 100c. For example, if a message is suspected as being spam with a high probability (e.g. 81% to 99% probability), then the message size module 305 may be adapted to forward to the device 100 only 10% of the normally allowable data size allotted to a message that is 100% verified as being a legitimate message.

As another example, if a message is scored as being spam with a moderate probability (e.g. 41% to 60%), then the message size module 305 may be adapted to forward to the device 100 some 30% of the allowable data size allotted to a message that is 100% verified as being a legitimate message.

On the other hand, if a message is scored as being spam with a low probability (e.g. 1% to 20%), then the message size module 305 may be adapted to forward to the device 100 some 50% of the allowable data size allotted to a message that is 100% verified as being a legitimate message. Thus, the size of the message sent may be inversely correlated to the probability that a message is spam.

It will be appreciated that the size of the message to be sent based on the probability may be different from the illustrative examples provided above. For example, for a message with a low probability of being spam, rather than delivering 50% of the normally allowable data size, 80% of the normally allowable data size may be sent instead. Thus, any suitable data size may be selected.

In another embodiment, in addition to specifying the size of the message to be sent, message size module 305 may be configured to allow an administrator to define rules other than the allowable data size for forwarding data, based on the probability of a message being spam. These rules may include, for example, restricting or allowing attachments to be sent, or whether to pass through messages sent in a rich format, such as html. The administrator may also make changes to various other email message properties, based on the probability of a message being spam.

Figure 4A:
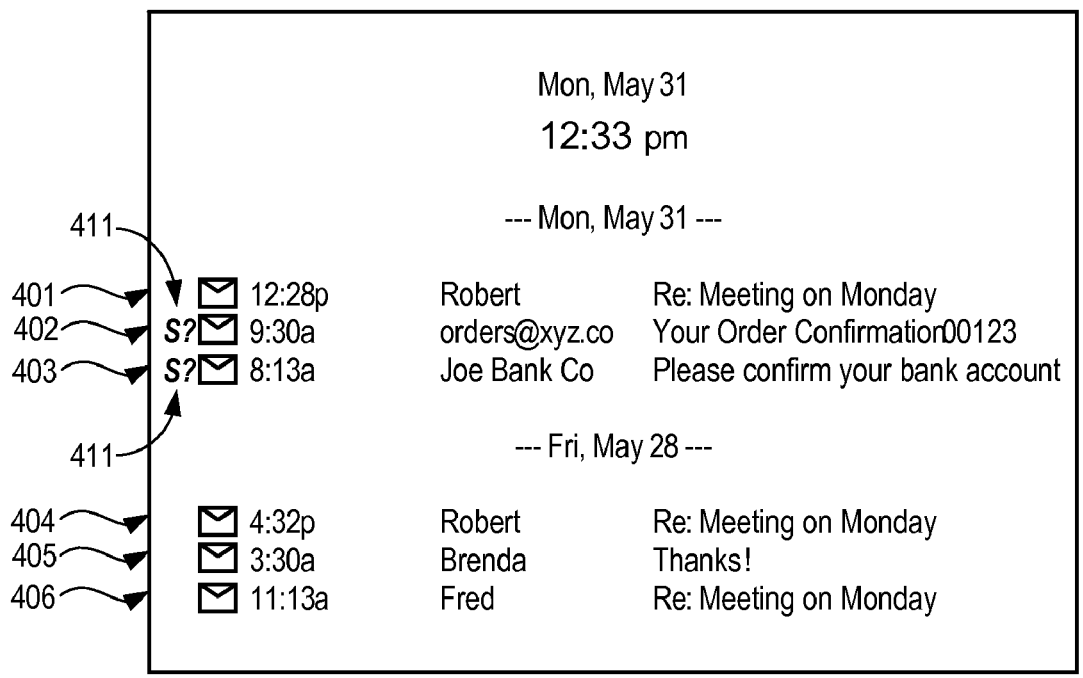
FIG. 4A is an illustrative message list user interface screen including a message suspected as being spam.

Now referring to FIG. 4A, shown is an illustrative example of a message list 400A displaying a number of email messages 401 to 406. In this illustrative example, messages 402 and 403 are suspected of being spam, and this may be indicated by some type of symbol or identifier placed next to message, such as a "S?" symbol 411 for example. It will be appreciated however that any other suitable symbol or identifier may be used instead. As shown in FIG. 4A, message 403 may be from an unrecognized email address from sender "Joe Bank Co" and the content of the message title may have caused spam filter 307 to calculate a moderate-high probability (e.g. 61% to 80%) that the message 403 is spam. Based on this calculation, message size module 305 may be configured to forward, for example, only 20% of the normally allowable data size.

Figure 4B:
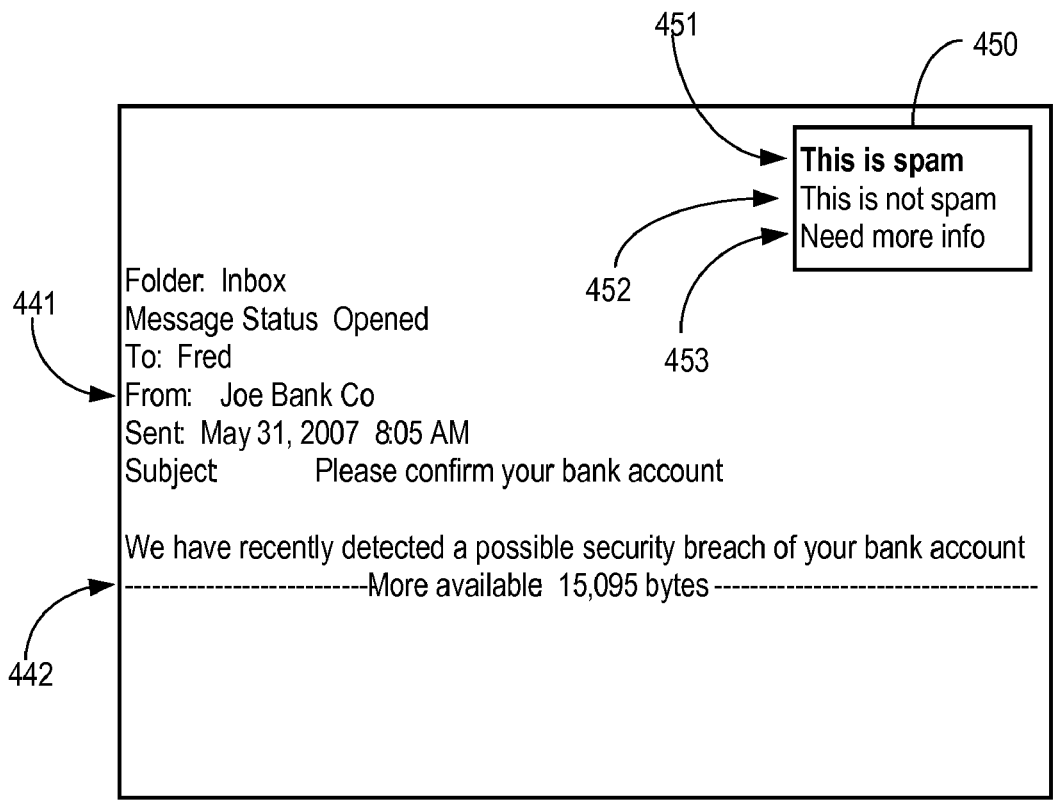
FIG. 4B is an illustrative message screen of a message suspected as being spam with a high probability.

An illustrative example of the contents of message 403 is shown in display 400B of FIG. 4B, where the message contents may include, for example, the header information including the sender 441, and the first few lines of the message body, with a "More available" statement at 442 to indicate that there is additional data available for download.

In an embodiment, the spam verification module 148 (FIG. 1) may be adapted to provide a pop-up or drop-down menu 450 to allow the user to verify, based on the user's review of the data in display 400B, whether "This is spam" 451, "This is not spam" 452, or the user will "Need more info" 453. The user may select "Need more info" 453, for example, if the user cannot make a determination based on the available data. In this case, message size module 305 may be configured to provide another 20% (or some other predetermined amount) of the message 403 to help the user make a determination as to whether or not the message is spam.

Figure 4C:
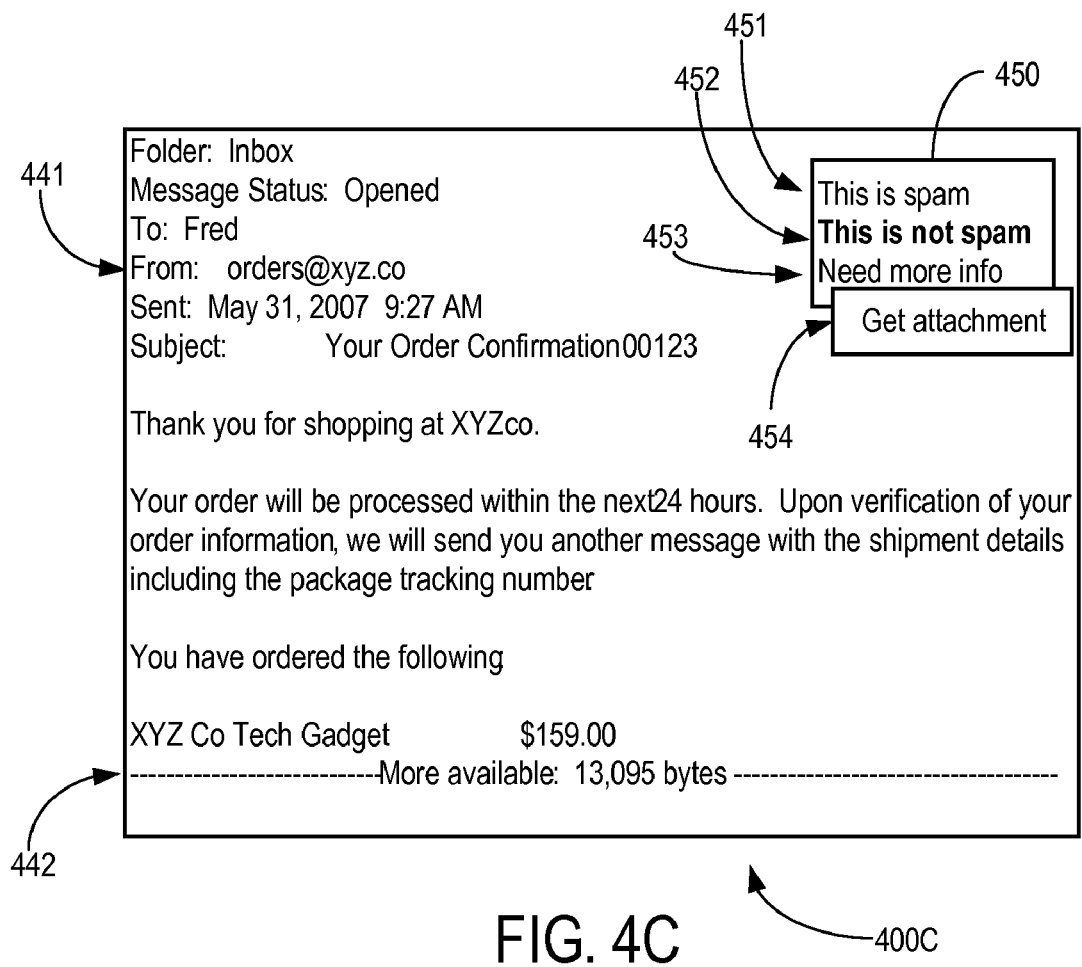
FIG. 4C is an illustrative message screen of a message suspected as being spam with a low probability.

Now referring to FIG. 4C, in another illustrative example, message 402 (of FIG. 4A) may be from an unrecognized sender "orders@xyz.co", but the spam filter 307 may have calculated only a low probability (e.g. 1% to 20%) that the message is spam. In this case, the message size module 305 may be configured to forward 50% of the normally allowable data size allotted to a message that is 100% verified as being a legitimate message. As illustrated in display 400C of FIG. 4C, the message may again include the header information, such as the sender 441, and a "More available" indication 442 to indicated that there is additional data available for download.

Again, the spam verification module 148 may be adapted to provide the user with a pop-up or drop-down menu 450 to allow the user to verify, based on the user's review of the available data, whether "This is spam" 451, "This is not spam" 452, or the user will "Need more info" 453. In an embodiment, if the user indicates that "This is not spam" 452, then the user may be provided with the option to "Get attachment" 454 if available, so that any attachment provided with the message is sent to the user's device 100.

Now referring to FIG. 5, shown is a schematic flowchart of an illustrative method 500 in accordance with an embodiment. As shown, method 500 begins and at block 502 calculates the probability that a message is spam. As explained earlier, this may be done using an appropriately configured spam filter, and the probability may be expressed as a percentage, or may be converted to a percentage value from a numerical score.

Method 500 then proceeds to block 504 where, in dependence upon the probability that a message is spam, method 500 may determine a variable message size. As an illustrative example, for possible categories including low, low-moderate, moderate, moderate-high, and high, the relative percentages of allowable data sent may be varied as 10%, 20%, 30%, 40% and 50% respectively. It will be appreciated however that the number of categories may be larger or smaller, and the relative percentages of allowable data sent may be varied as well.

Method 500 then proceeds to block 506, where the message is sent to communication device 100 in the determined message size to be verified by a user.

At block 508, method 500 waits for response from the user as to whether the message is spam, is not spam, or if more information is required in order to make the determination. Method 500 may then proceed to decision block 510.

At decision block 510, if the message is verified as being spam, method 500 may proceed to block 511 and optionally blacklist and discard the spam message. Method 500 may then end. If no, method 500 proceeds to decision block 512.

At decision block 512, if the message is verified as not being spam, method 500 may proceed to block 513 and optionally white list the legitimate message and send the remainder of the message with any attachments. Method 500 may then end. If no, method 500 proceeds to decision block 514.

At decision block 514, if the user has requested more information in order to make a determination of whether or not a message is spam, method 500 may proceed to block 515 where method 500 may configure the message size module to send additional data. Method 500 may then return to block 508 to wait for a user response.

At decision block 514, if the user has not requested any more information, and has not verified the message as being spam or not spam, then method 500 may proceed to block 516 where method 500 may indicate that the status of the message is not determined. Method 500 may then end.

The flowchart 600 of FIG. 6 illustrates in further detail the process of block 504 of FIG. 5. After obtaining the probability that the message is spam at 602, a determination is made at 604 whether the message is indeed spam (i.e., a 100% probability and/or a message received from a blacklisted user). If the message is spam, it is filtered at 606 and not sent to the device. If the message is not determined to be spam, it is determined at 608 whether it is legitimate. If the message is determined to be legitimate, it is forwarded at 610. If, however, it is not determined to be spam or legitimate, then the method proceeds to 612, where the message is categorized, based on its probability of being spam, according to the probability ranges discussed above. Next, the size of the message portion to be forwarded based on the message's category (i.e., the probability range into which it falls) is determined at 614. The method then proceeds with the transmission of the portion of the message, as in block 506 of FIG. 5.

As will be appreciated, by varying the size of the message sent, and by optionally withholding any attachments until a message is verified by a user as being legitimate, a significant amount of wireless bandwidth may be saved in verifying suspected spam messages.

Thus, in an aspect, there is provided a method of delivering a message to a communication device, comprising: obtaining a probability that the message is spam; in dependence upon the probability that the message is spam, determining a variable message size; and sending the message to the communication device in dependence upon the determined variable message size.

In an embodiment, the method further comprises: receiving a user response whether the message is spam; and if the message is verified as being spam, then filtering the message from the communication device.

In another embodiment, the method further comprises, if the message is verified as not being spam, then sending the remainder of the message to the communication device.

In another embodiment, the method further comprises forwarding any attachments to the message verified as not being spam.

In another embodiment, the method further comprises, if the user needs more information, then sending an additional portion of the message to the communication device.

In another embodiment, the method further comprises setting the variable message size to correlate inversely to the probability that the message is spam.

In another embodiment, the method further comprises calculating the probability that the message is spam.

In another aspect, there is provided a system for delivering a message to a communication device, comprising: means for obtaining a probability that the message is spam; means for determining a variable message size in dependence upon the probability that the message is spam; and means for sending the message to the communication device in dependence upon the determined variable message size.

In an embodiment, the system further comprises: means for receiving a user response whether the message is spam; and means for filtering the message from the communication device if the message is verified as being spam.

In another embodiment, the system further comprises means for sending the remainder of the message to the communication device if the message is verified as not being spam.

In another embodiment, the system further comprises means for forwarding any attachments to the message verified as not being spam.

In another embodiment, the system further comprises means for sending an additional portion of the message to the communication device if the user needs more information.

In another embodiment, the system further comprises means for setting the variable message size to correlate inversely to the probability that the message is spam.

In another embodiment, the system further comprises means for calculating the probability that the message is spam.

In another aspect, there is provided a data processor readable medium storing data processor code that when loaded into a data processing device adapts the device to execute a method of delivering a message to a communication device, the data processor readable medium comprising: code for obtaining a probability that the message is spam; code for determining a variable message size in dependence upon the probability that the message is spam; and code for sending the message to the communication device in dependence upon the determined variable message size.

In an embodiment, the method further comprises: code for receiving a user response whether the message is spam; and code for filtering the message from the communication device if the message is verified as being spam.

In another embodiment, the method further comprises code for sending the remainder of the message to the communication device if the message is verified as not being spam.

In another embodiment, the method further comprises code for forwarding any attachments to the message verified as not being spam.

In another embodiment, the method further comprises code for sending an additional portion of the message to the communication device if the user needs more information.

In another embodiment, the method further comprises code for setting the variable message size to correlate inversely to the probability that the message is spam.

While illustrative embodiments have been described above, it will be appreciated that various changes and modifications may be made. More generally, the scope of the invention is defined by the following claims.

What is claimed is:

1. A method of delivering messages to a communication device, the method comprising:
for each message of a plurality of messages received at a server for delivery to the communication device,
obtaining a probability that said message is spare;
if said message is determined to be legitimate, the server transmitting a portion of said message for receipt by the communication device, the portion being an allowable data size; and
for all other messages of the plurality of messages determined to be neither legitimate nor spare,
the server correlating said message to one of a plurality of categories according to said probability, each of the plurality of categories corresponding to a range of probabilities and a percentage of the allowable data size, the ranges of probabilities inversely corresponding to the percentage of the allowable data size; and
the server transmitting a smaller portion of said message thus correlated for receipt by the communication device, a size of the smaller portion being determined by said corresponding percentage of the allowable data size, such that different sizes of smaller portions are transmitted for different ones of the plurality of messages;
wherein when said message is determined to be neither legitimate nor spam, providing options to indicate that the message is spam, indicate that the message is not spam, and request a further portion of the message; and in response to selection of the option to indicate that the message is not spam, providing the option to download an attachment to the message.

2. The method of claim 1, further comprising, if said message is determined to be spam, filtering said message from being transmitted to the communication device.

3. The method of claim 1, wherein said message is determined to be spam when the probability that the message is spam is 100%.

4. The method of claim 3, wherein said message is determined to be neither legitimate nor spam when it is associated with a probability greater than 0% and below 100%.

5. The method of claim 1, wherein the plurality of categories includes a category corresponding to a higher probability range and a category corresponding to a lower probability range, and the percentage of the allowable data size associated with the category corresponding to the higher probability range is smaller than the percentage of the allowable data size associated with the category corresponding to the lower probability range.

6. The method of claim 1, wherein the plurality of categories includes at least five categories each associated with a different probability range.

7. The method of claim 1, wherein the allowable data size comprises a size allotted to a message that is determined to be a legitimate message.

8. The method of claim 1, further comprising, after transmitting the smaller portion of said message, transmitting a further portion of said message to the communication device in response to a received request.

* * * * *

UNITED STATES PATENT AND TRADEMARK OFFICE
CERTIFICATE OF CORRECTION

PATENT NO. : 8,230,025 B2
APPLICATION NO. : 11/858461
DATED : July 24, 2012
INVENTOR(S) : Daryl Martin, John F. Wilson and Christopher O'Keefe It is certified that error appears in the above-identified patent and that said Letters Patent is hereby corrected as shown below:

Column 8, line 20, Claim 1, delete "spare" and insert therefor --spam--; and
Column 8, line 26, Claim 1, delete "spare" and insert therefor --spam--.

Signed and Sealed this
Twenty-seventh Day of November, 2012

David J. Kappos
*Director of the United States Patent and Trademark Office*